United States Patent [19]

Kharrazi

[11] Patent Number: 4,719,113

[45] Date of Patent: Jan. 12, 1988

[54] YOGURT FOOD PRODUCT RESEMBLING CHEESE

[76] Inventor: Nourollah M. Kharrazi, P.O. Box 3336, Santa Barbara, Calif. 93130

[21] Appl. No.: 867,016

[22] Filed: May 27, 1986

[51] Int. Cl.$^4$ .................... A23C 9/12; A23C 19/076; A23C 20/00

[52] U.S. Cl. ........................ 426/35; 426/39; 426/40; 426/582; 426/583; 426/573; 426/656

[58] Field of Search .................... 426/34–43, 426/46, 61, 63, 64, 573, 575–578, 580, 582, 583, 585, 588, 634, 656, 657, 662, 804

[56] References Cited

U.S. PATENT DOCUMENTS

| | | | |
|---|---|---|---|
| 4,434,184 | 2/1984 | Kharrazi | 426/582 |
| 4,459,313 | 7/1984 | Swanson et al. | 426/583 |
| 4,534,982 | 8/1985 | Yoshida et al. | 426/42 |
| 4,560,560 | 12/1985 | Narimatsu et al. | 426/582 |

*Primary Examiner*—Raymond N. Jones
*Assistant Examiner*—Marianne M. Cintins
*Attorney, Agent, or Firm*—Jack C. Munro

[57] ABSTRACT

A food product and method of making same which is to have the consistency of cheese as well as the taste of the particular selected cheese, but only has a fraction of the fat and cholesterol content of the normal cheese. The food product is produced by starting with a certain quantity of a liquid such as water and/or milk, heating the liquid to a temperature of approximately one hundred eighty degrees Fahrenheit and then gradually blending into the heated liquid a quantity of a dry mixture until a viscous mixture is obtained. The dry mixture includes dehydrated yogurt powder, vegetable oil and skim milk as its main ingredients. The temperature of this viscous mixture is decreased to approximately one hundred degrees Fahrenheit. Added to and evenly mixed with the viscous mixture is a quantity of yogurt. Excess moisture is then removed from the viscous mixture to obtain a solid firm mass.

2 Claims, No Drawings

YOGURT FOOD PRODUCT RESEMBLING CHEESE

BACKGROUND OF THE INVENTION

The field of this invention relates generally to the method of making a food product which has the appearance, taste, consistency and texture of cheese and has the fat contents significantly below that of conventional cheese.

Through recent years, for health as well as cosmetic reasons, there has developed an increasing concern with diet which is focused on diets with reduced calorie and fat consumption. Low calorie foods which look and taste like their higher calorie counterparts have been eagerly sought by the public. To this end, food researchers have concentrated on developing food products which are nutritious and palatable, but which contain substantially reduced levels of calories and/or fat. This has been particularly true in the dairy industry where such low calorie, low fat products as skim milk, yogurt and the like have been successfully marketed.

However, the high fat levels in some cheeses have heretofore been thought to be necessary to have a desirable taste. As a result, those individuals desiring to reduce their calorie or fat intake have usually omitted cheeses such as Cheddar, Blue, Mozzarella, Swiss, Romano, Parmesan and the like from their diets.

Previously, there have been efforts to prepare cheeses which are low in fat. Most conventional cheeses have a fat content of somewhere between thirty-five to forty percent. Heretofore the methods used to reduce the fat quantity of a cheese have produced some cheese with approximately a fifty percent reduction in fat. Although this is a substantial reduction for many individuals, an eighteen to twenty-five percent fat is still too great a level of fat for those on diets. Also, such imitation cheeses have not had a desirable taste.

It is has been believed that a low fat cheese must utilize as a basic component, a cheese product such as cottage cheese curd. It has not been known previously to construct imitation block type of cheeses such as Cheddar, Jack cheese, Mozzarello and the like by utilizing yogurt instead of cottage cheese curd. It has been found that by utilizing yogurt as a basic component, the taste is significantly enhanced and more closely resembles the original product. Also, the imitation food product has the consistency, appearance and texture of the cheese which it imitates.

Cheeses are also frequently used in other types of food. One example of such would be pizza. In the case of a pizza, if a low fat good tasting substitute could be utilized for the cheeses that are placed on the pizza, a significant decrease in the amount of calories and fat content would occur. A great many people within the United States do not eat pizza solely for the reason that it is high in calories and also high in fat. A pizza that substantially reduces both calories and fat would then be potentially consumable by a greater number of people.

SUMMARY OF THE INVENTION

The primary objection of the present invention is to provide a rigid block type of cheese food product which not only resembles a particular cheese in appearance, texture and taste, but which has a fat content substantially below that of its conventional counterpart.

It is another objective of this invention to provide a method for making the cheese type of food product of the present invention.

In accordance with the aforesaid objectives, the present invention utilizes a process for making a low calorie, low fat, cheese type of product resembling a rigid block type of cheese in appearance, texture and taste which includes a step of utilizing a quantity of liquid. The liquid is to comprise milk or water or a combination of both. The quantity of liquid milk is initially heated to a temperature of approximately one hundred eighty degrees Fahrenheit. A dry mixture is added to the liquid milk. Basic components of the dry mixture are dehydrated yogurt powder, casein, tofu, vegetable oil and skim milk. This dry mixture is evenly mixed with the heated liquid until a viscous mixture is obtained. This viscous mixture is then permitted to cool to approximately one hundred degrees Fahrenheit. To every pound of this viscous mixture there is added three-fourths to one pound of yogurt. This yogurt is then mixed in thoroughly. The resulting mixture is then reduced in moisture approximately fifty percent. A common way to remove the moisture is by the use of pressure. After the reducing of the moisture, a solid firm mass is obtained. By varying of the method slightly and also varying the ingredients, a cheese type of sauce can be obtained as opposed to a solid mass.

DETAILED DESCRIPTION OF THE INVENTION

The present invention broadly relates to a cheese type of product which is to be manufactured to resemble the selected type of cheese in appearance, texture and taste which has a fat and cholesterol content substantially below that of its conventional counterpart. The food product of the present invention is constructed principally of yogurt which is known to be hightly nutritious and also highly desirable for those who wish to decrease their calorie intake and reduce fat and cholesterol content of their diet.

The process by which the food product of the present invention is made, utilizes initially a liquid composed of either a milk or a water. The milk can be either reconstituted powdered regular, low fat or skim milk. The water would normally be distilled water. It may be found to be desirable in some instances to utilize fifty percent milk and fifty percent water, or one hundred percent milk and no water, or all water and no milk, or any other combination of percentages of milk and water. The liquid is to be heated to a temperature of approximately one hundred eighty degrees Fahrenheit. It is not necessary to maintain the heating of the liquid for any great length of time. It is only necessary for the liquid to reach the desired temperature which will cause the bacteria contained within the liquid to be destroyed.

In order to form the solid type of cheese product, a dry mixture is then added to this liquid milk. For making a Cheddar type of yogurt, the following ingredients are to be employed in the following percentage by weight:

| Ingredients: (By Weight) | Percentages |
| --- | --- |
| Dehydrated Yogurt Powder | 20 |
| Casein | 15 |
| Tofu | 10½ |
| Vegetable fat (partially hydrogenated oil) | 10 |
| Skim Milk | 10 |
| Whey | 8 |

-continued

| Ingredients: (By Weight) | Percentages |
|---|---|
| Soy Protein Solids (isolated) | 6 |
| Natural and/or artificial cheddar flavor | 4 |
| Lecithin | 4 |
| Enzyme (lipase powder) | 3 |
| Salt | 2 |
| Citric Acid | 2 |
| Lactic Acid | 2 |
| Sorbic Acid | 1 |
| Annatto (vegetable coloring/yellow) | 1 |
| Xanthan, Guar and Locust Beans (each ½%) | 1½ |

This dry mixture is stirred into the hot liquid until a rather viscous mixture is obtained. This resulting mixture is then permitted to cool, while still being stirred, to approximately one hundred degrees Fahrenheit. At this time, to every pound of viscous mixture, there is to be added three-fourths to one pound of yogurt. Any conventional non-flavored yogurt would be satisfactory.

Once this yogurt has been thoroughly mixed with the viscous mixture, the resulting mixture is now ready to be reduced in moisture. Approximately a fifty percent reduction of moisture is necessary for the resulting mixture to assume a solid mass configuration. A common simple way to remove the moisture would be by means of a press which would apply pressure to the resulting mixture until the desired quantity of moisture has been removed. The desired quantity is such that the resulting mass will assume a consistency in texture similar to that of the product which it resembles. In other words, Cheddar cheese is rather firm and sufficient moisture is removed until this mixture assumes this firmness.

Within the Cheddar yogurt, it is possible that the quantity of yogurt powder could vary from ten to forty-five percent. In which case the appropriate variation in percentage by weight will be proportionately divided or subtracted from the tofu, vegetable oil, skim milk and whey in equal amounts.

If it is desired to make a Blue cheese type of composition, the same ingredients are utilized as for Cheddar yogurt, except the cheddar flavor is removed and replaced by a Blue cheese flavor. Also, the casein would be reduced to seven and one-half percent with the remaining seven and one-half percent being proportionately and evenly added to the tofu, vegetable fat, skim milk and whey. Also the annatto is removed.

Because Blue cheese has somewhat less firmness, the amount of moisture removed from this composition would be somewhat less that what is removed within the Cheddar yogart.

For Mozzarella yogurt (resembling Mozzarella cheese) the ingredients and the process would be the same as above discussed with the exception that the annatto is removed together with the cheddar flavor and replaced with mozzarella flavor. Again, since Mozzarella cheese has a somewhat greater moisture level than Cheddar cheese, a slightly less amount of moisture is then removed from this composition.

In order to make Swiss yogurt, resembling Swiss cheese, the ingredients and method is the same again, minus the annatto, vegetable coloring and the cheddar flavor. in their stead, Swiss cheese flavor is added. Basically the same procedure is to be followed for Romano yogurt, Parmesan yogurt and Jack yogurt, or possibly any other desired flavor of cheese.

If it is desirable to produce a sauce instead of a block type of mass, a slightly different dry mixture is utilized.

For example, to achieve a Cheddar, Nacho flavored, yogurt sauce the following dry mixture is to be utilized:

| Ingredients (By Weight) | Percentage |
|---|---|
| Yogurt Powder | 33 |
| Skim Milk solids | 5 |
| Partially Hydrogenated coconut oil or other vegetable oil | 5 |
| Corn Syrup solids | 5 |
| Whey Solids | 5 |
| Casein | 5 |
| Guar gum | 1 |
| Alginate (Kelco Dariloid KB) | 1 |
| Sodium Caseinate | 1 |
| Lactic Acid | 2 |
| Cheddar flavor (natural) | 2 |
| Mono & Diglycerides | 1 |
| Disodium phosphate | 1 |
| MSG | 1 |
| Maltodextrin | 1 |
| Potassium sorbate | 1 |
| Sodium Benzoate | 1 |
| Vegetable coloring (Annatto) | 1 |
| Sorbitan monostearate | 1 |
| Salt | 3 |
| Sugar | 2 |
| Jalapeno pepper (powder) | 2 |
| White pepper (powder) | 2 |
| Citric Acid | 2 |
| Lactic Acid | 2 |
| Sorbic Acid | 1 |
| Tofu | 5 |
| Blend of herbs/spices | 4 |
| Garlic granules | 2 |
| Red & Green bell peppers | 2 |

For each two ounces of the dry mixture for the sauce, one cup of water or milk is to be heated to between one hundred eighty to two hundred twelve Fahrenheit. This dry mixture is added and stirred in thoroughly to prevent lumping. This is simmered for a few minutes over low heat. The user may desire to increase or decrease the quantity of dry mixture for either a thicker or thinner type of sauce. Once the desired consistency has been obtained, the resulting mixture is removed from the heat to then be consumed.

If it is desired to achieve a more milder type of sauce, the user can eliminate the use of the Jalapeno and the white pepper from the sauce dry mixture. In such an instance the yogurt powder will be increased from thirty-three percent to thirty-six percent.

It is to be understood that the block type of cheeses that could be obtained by the method of this invention are capable of being grated or shredded and packaged in any conventional manner such as a bag or in a can or the like.

It may be desirable in some compositions to decrease or eliminate the casein or toful. The eliminated percentage is added to the yogurt powder. The yogurt cheese product produced by this invention could be used as a cheese topping for hamburgers, as a cheese additive in French-Onion soup, plus many other uses.

What is claimed is:

1. The method of making a food product from yogurt resembling cheese in color, consistency and taste comprising the steps of:

selecting a quantity of liquid selected from the group consisting of water, milk and mixtures thereof;

heating the liquid to a temperature of approximately one hundred eighty degrees Fahrenheit;

gradually blending a quantity of a dry mixture into the heated liquid until a viscous mixture is obtained wherein the dry mixture comprises dehydrated yogurt powder, casein, tofu, vegetable fat, skim milk powder, whey, soy protein solids, cheese flavor, lecithin, lipase, salt, citric acid, lactic acid, sorbic acid and gum;

decreasing the temperature of the viscous mixture to approximately one hundred degrees Fahrenheit;

evenly mixing with the viscous mixture a quantity of yogurt with the yogurt comprising approximately seventy-five percent by weight of the viscous mixture; and removing sufficient moisture from the viscous mixture to obtain a solid firm mass.

2. A food product prepared by the method of claim 1.

* * * * *